United States Patent [19]
Armel

[11] Patent Number: 5,879,089
[45] Date of Patent: Mar. 9, 1999

[54] KEYBOARD ARRANGEMENT

[76] Inventor: Gerald J. Armel, 5 Barrows Ct., Norton, Mass. 02766

[21] Appl. No.: 27,050

[22] Filed: Feb. 20, 1998

[51] Int. Cl.[6] .......................................................... B41J 5/08
[52] U.S. Cl. ........................................... 400/489; 400/486
[58] Field of Search .................................... 400/489, 486, 400/485, 487, 488

[56]  References Cited

U.S. PATENT DOCUMENTS

| | | | |
|---|---|---|---|
| 2,080,457 | 5/1937 | Bower | 400/486 |
| 3,698,533 | 10/1972 | Illig et al. | 400/486 |
| 3,847,263 | 11/1974 | X | 400/486 |
| 4,613,247 | 9/1986 | McGunnigle | 400/489 |
| 4,927,279 | 5/1990 | Morgan | 400/486 |
| 5,166,669 | 11/1992 | Romberg | 400/489 X |
| 5,336,002 | 8/1994 | Russo | 400/489 |
| 5,689,253 | 11/1997 | Hargreaves et al. | 400/489 X |

FOREIGN PATENT DOCUMENTS 0066991  12/1982  United Kingdom .

OTHER PUBLICATIONS

Richard S. Hirsch, Effects ofKeyboard Formats on Typing Performance, Journal of Applied Psychology (vol. 54, No. 6, 484–490), Apr. 13, 1970.

*Primary Examiner*—Edgar Burr
*Assistant Examiner*—Minh Chau
*Attorney, Agent, or Firm*—Barlow, Josephs & Holmes, Ltd.

[57]  ABSTRACT

A keyboard for typewriters, word processors, computers, and the like, has a housing and a plurality of manually actuated keys secured to the housing including keys for each letter of the alphabet and a plurality of character keys. The keys are arranged in rows including a central home row, an upper row, and a lower row. The central home row has a first group of keys including the letters "E" and "A" arranged from left to right, the lower row has a second group of keys including the letters "I", "O" and "U" arranged from left to right, and the upper row has a third group of keys including the letters "S", "T" and "R" arranged from left to right. The central home row further has a fourth group of keys including two subsets, a first subset of keys including the letters "M" and "N" arranged from left to right and a second subset of keys including the letters "H" and "G" arranged from left to right. Similarly, the upper row has a fifth group of keys including two subsets, a first subset of keys including the letters "C" and "D" arranged from left to right and the second subset of keys including the letters "P" and "L" arranged from left to right.

25 Claims, 1 Drawing Sheet

KEYBOARD ARRANGEMENT

BACKGROUND OF THE INVENTION

1. Field of the Invention

The instant invention relates generally to keyboards used for typewriters, computers and word processors, and more particularly to a novel keyboard arrangement.

2. Description of Prior Art

Over the years, there have been many efforts to improve keyboards used for typewriters, computers and word Processors. In this regard, reference can be made to U.S. Pat. No. 5,166,669 to Romberg as representative prior art in this area.

Generally, Romberg discloses a key arrangement that is directed to improve the standard "QWERTY" key arrangement found on the majority of keyboards. It is known that the "QWERTY" key arrangement, while effective for its intended purpose, is inefficient for enabling a person typing on a "QWERTY" keyboard to achieve relatively high typing speeds. The limitations of the "QWERTY" keyboard are described in detail in the Romberg patent.

Specifically, Romberg discloses a key arrangement having a central home row, an upper row and a lower row. The central home row includes the letters "A", "S", "E", "R", "D", "H", "N", "T", "I" and "O" arranged from left to right. The upper row includes the letters "Q", "W", "K", "F", "G", "Y", "U", "L", and "P" arranged from left to right. Finally, the lower row includes the letters "Z", "X", "C", "V", "B", "J", and "M" arranged from left to right. Romberg's main objective is to improve the efficiency of the keyboard without relocating too many of the keys as they are found on the standard "QWERTY" key arrangement. For example, in the lower row of Romberg's key arrangement, the key having the letter "J" is the only key that differs from the "QWERTY" key arrangement.

One significant disadvantage with Romberg's key arrangement is that the most used keys are inefficiently placed in that several of the most used keys, such as the keys having letters "T", "O", "A" and "S", are manipulated by fingers other than the index and middle fingers. Romberg assumes that by limiting the relocation of the letters on the keys, a user will be able to learn and perform his method with greater ease. However, any departure from the standard "QWERTY" key arrangement is difficult to learn and use by individuals familiar with this well known system. Thus, in order to maximize efficiency, it is desirable to locate the letters on the keys in places so that the most dexterous fingers, i.e., the index and middle fingers, perform the majority of the key striking.

SUMMARY OF THE INVENTION

The instant invention is directed to a keyboard for typewriters, word processors, computers, and the like, having a housing and a plurality of manually actuated keys secured to the housing including keys for each letter of the alphabet and a plurality of character keys. The keys are arranged in rows including a home row, an upper row positioned above the home row, and a lower row positioned below the home row.

The home row has a first group of keys, located generally in the center of the home row, including the letters "E" and "A" arranged from left to right. The lower row has a second group of keys, located generally in the center of the lower row, including the letters "I", "O" and "U" arranged from left to right. The upper row has a third group of keys, located generally in the center of the upper row, including the letters "S", "T" and "R" arranged from left to right.

The home row further includes a fourth group of keys which is divided into first and second subsets, the first subset of keys being positioned to the left of the first group (EA) and the second subset of keys being positioned to the right of the first group (EA). The first subset of keys of the fourth group includes the letters "M" and "N" arranged from left to right and the second subset of keys of the fourth group includes the letters "H" and "G" arranged from left to right. The upper row has a fifth group of keys which is also divided into first and second subsets, the first subset of keys of the fifth group being positioned to the left of the third group (STR) and the second subset of keys of the fifth group being positioned to the right of the third group (STR). The first subset of keys of the fifth group includes the letters "C" and "D" arranged from left to right and the second subset of keys of the fifth group includes the letters "P" and "L" arranged from left to right.

Accordingly, a primary object of the instant invention is the provision of an improved keyboard arrangement which has its keys efficiently positioned on the keyboard so that the majority of the letters provided on the keys most used during typing, word processing, etc. are struck by the person's index and middle fingers.

Other objects, features and advantages of the invention shall become apparent as the description thereof proceeds when considered in connection with the accompanying illustrative drawing.

BRIEF DESCRIPTION OF THE DRAWING

In the drawing which illustrates the best mode presently contemplated for carrying out the present invention, there is shown a top plan view of a keyboard arrangement of the present invention.

DETAILED DESCRIPTION OF THE PREFERRED EMBODIMENT

Figure 1:
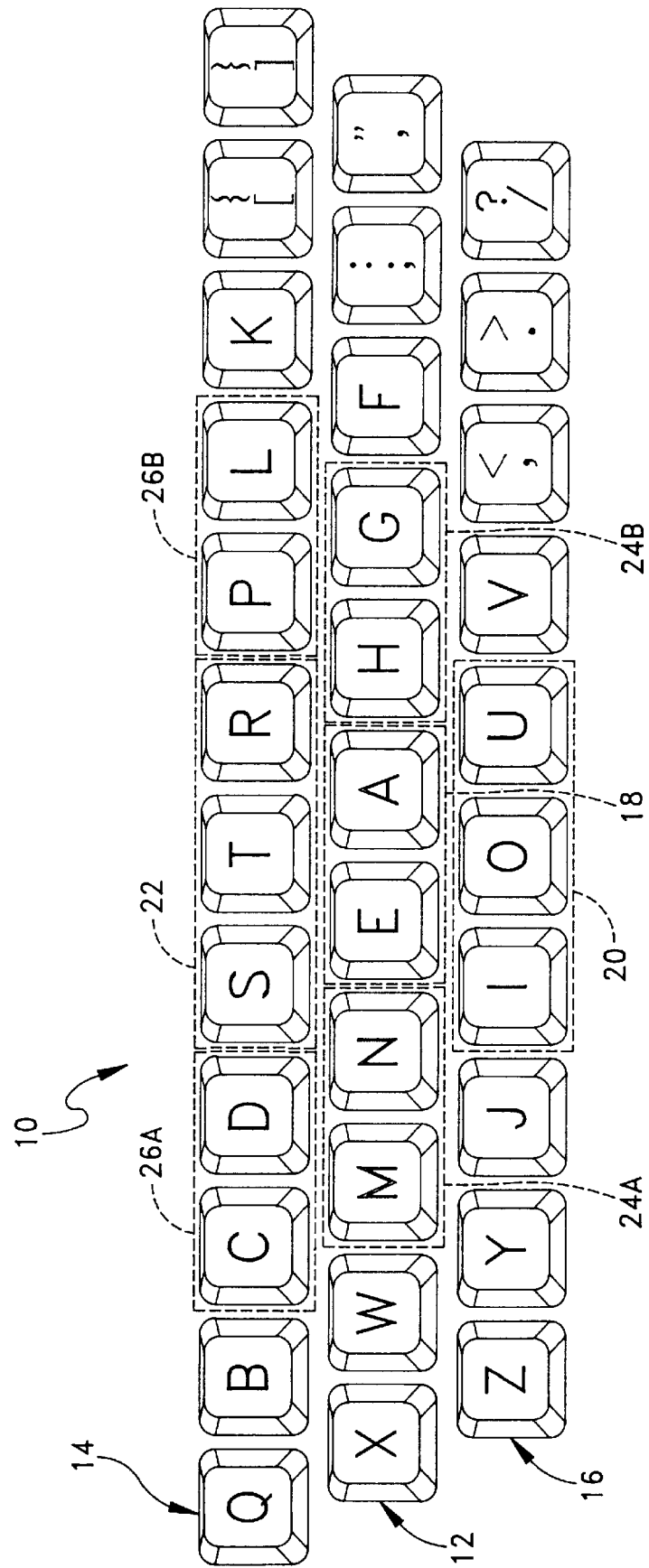

Referring now to the drawing, there is generally indicated at 10 a keyboard arrangement of the present invention. As will hereinafter be more fully described, the keyboard is generally designed to increase typing efficiency and typing speeds.

More specifically, as illustrated in the drawing, the keyboard arrangement 10 includes three rows, namely, a home row, generally indicated at 12, an upper row, generally indicated at 14, and a lower row, generally indicated at 16. It should be understood that the principles of the instant invention can be applied to keyboards further having the conventionally positioned rows which include number keys, character keys and function keys, along with the space bar, and still fall within the scope of the invention. For clarity, the rows having number keys, function keys, the space bar and other characters are not illustrated in the drawing.

The home row 12 includes a first group 18 of keys having the letters "E" and "A" arranged from left to right. As is disclosed by Romberg in his patent, the letter "E" is the most frequently used letter in the alphabet, and the letter "A" is the sixth. Both of the keys of the first group 18 are manipulated by the user's index fingers. A second group 20 of keys including the letters "I", "O" and "U" arranged from left to right are positioned immediately below the first group 18 and offset therefrom in conventional fashion. The second group 20 rounds out the vowels of the alphabet. As with the first group 18, the keys of the second group are also manipulated by the index fingers of the user's hands.

The upper row 14 includes a third group 22 of keys including, from left to right, the letters "S", "T" and "R". These letters ("S", "T" and "R") are the eighth, second and fourth most frequently used letters. The third group 22 of keys are positioned immediately above the first group 18, and are aligned with the keys of the second group 20. Thus, the third group 22 of keys are also manipulated by the user's index fingers.

It should be observed that with the keyboard arrangement 10 of the instant invention, the first, second, fourth, fifth, sixth, seventh, eighth and fifteenth most frequently struck keys are each manipulated by the user's index fingers. Thus, the overall efficiency of the keyboard is greatly increased since the index fingers of the user's hands provide greater dexterity and reach than any of the other remaining fingers.

The home row 12 further includes a fourth group of keys divided into two subsets 24A, 24B. Subset 24A is positioned to the left of the first group 18, and includes the letters "M" and "N" arranged from left to right. These letters are ranked sixteenth and second, respectively, in their amount of usage in the English language. The key having the letter "N" is the home key for the user's left hand and is manipulated by the user's left index finger. The key having the letter "M" is manipulated by the user's left middle finger. Subset 24B is positioned to the right of the first group 18, and includes the letters "H" and "G" arranged from left to right. "H" and "G" are the eleventh and eighteenth most frequently used letters of the alphabet, respectively. The key having the letter "H" is the home key for the user's right hand and is manipulated by the user's right index finger, whereas the key having the letter "G" is manipulated by the user's right middle finger.

Similarly, the upper row 14 further includes a fifth group of keys divided into two subsets 26A, 26B. Subset 26A is positioned to the left of the third group 22, and includes the letters "C" and "D" arranged from left to right. These letters are ranked twelfth and ninth, respectively, in their amount of usage in the English language. The key having the letter "D" is manipulated by the user's left index finger and the key having the letter "C" is struck by the user's left middle finger. Subset 26B is positioned to the right of the third group 22, and includes the letters "P" and "L" arranged from left to right. "P" and "L" are the fourteenth and tenth most frequently used letters of the alphabet, respectively. The key having the letter "P" is struck by the user's right middle finger and the key having the letter "L" is manipulated by the user's right ring finger.

The location of the remaining letters is not as critical as that of the above-identified letters. The home row 12, to the left of the fourth subset 24A, includes, from left to right, the letters "X" and "W". Located to the right of subset 24B on the home row 12, are the letter "F" and the punctuation marks ";" and "'". In the upper row 14, to the left of the fifth subset 26A (CD), the letters "Q" and "B" are arranged from left to right. Still in the upper row, located to the right of the subset 26B (PL) is the letter "K" and the punctuation marks "[" and "]" arranged from left to right. In the lower row 16, to the left of the second group 20(IOU) are the letters "Z", "Y" and "J" arranged from left to right. In the lower row, to the right of the second group (IOU) is the letter "V" and the punctuation marks ",", ".", and "/". As stated above, the position of these letters and other indicia are not as important as the location of the letters of groups 18, 20, 22, 24 and 26.

Accordingly, it can be seen that the instant invention provides a unique and novel keyboard arrangement which increases the overall efficiency of the person using the keyboard. It will be appreciated by those skilled in the art that the keyboard is generally designed so that the user's hands in the regular home position do not block any of the most commonly used keys except the letters M and N which are located under the left middle and index fingers respectively, and the letters H and G which are located under the right middle and index fingers. The keyboard is further arranged so that all of the vowels EA, and IOU are visible and lie in the core area of the keyboard. The letters provided in the first, second, third, fourth and fifth groups 18, 20, 22, 24, and 26 include the twelve most frequently used letters of the alphabet and all of the letters covered by these groups, except for the letter "L" are struck by either the index fingers or the middle fingers of the user's hands. With this unique arrangement, the formation of many words can be accomplished with all of the letters visible. Quick and easy word formulation is still further enhanced by vowel phonic combination of EA, IO, and OU which are already sequenced. Even further still, word formulation is enhanced by the additional common consonant combinations of ST, TR, SR, PL, RP, and HG already sequenced on the keyboard. The letter sequences of BCD, WXYZ and HGF (FGH in reverse) are also easily visible to the typist during use. Since the most commonly used letters are clustered toward the center of the keyboard and available to the index and middle fingers, the domain of each hand is not as rigidly defined, thus allowing the fingers of each hand to cross over in the core cluster of letters. The inventor believes that this keyboard will be especially relevant to those who have dexterity impairments, including those with rheumatoid conditions (arthritis), and the large percentage of the population that remains unable to acquire a high level of competence in operating the QWERTY design. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a keyboard for typewriters, word processors, computers, and the like, having a housing and a plurality of manually actuated keys secured to the housing including keys for each letter of the alphabet and a plurality of character keys, said keys being arranged in three rows consisting of a central home row, an upper row positioned above the home row, and a lower row positioned below the home row, said central home row having 11 keys, said central home row having a first group of keys including the letters "E" and "A" arranged from left to right, said "E" and "A" keys respectively occupying the $5^{th}$ and $6^{th}$ key positions counting from left to right in the row.

2. The keyboard set forth in claim 1, said lower row having a second group of keys including the letters "I", "O" and "U" arranged from left to right.

3. In a keyboard for typewriters, word processors, computers, and the like, having a housing and a plurality of manually actuated keys secured to the housing including keys for each letter of the alphabet and a plurality of character keys, said keys being arranged in rows including a central home row, an upper row positioned above the home row, and a lower row positioned below the home row, said central home row having a first group of keys including the letters "E" and "A" arranged from left to right, said lower row having a second group of keys including the letters "I", "O" and "U" arranged from left to right, said upper row having a third group of keys including the letters "S", "T" and "R" arranged from left to right.

4. The keyboard set forth in claim 3, said central home row further having a fourth group of keys including two subsets, a first subset of keys being positioned to the left of the first group and a second subset of keys being positioned to the right of the first group, the first subset of keys of the fourth group including the letters "M" and "N" arranged from left to right and the second subset of keys including the letters "H" and "G" arranged from left to right.

5. The keyboard set forth in claim 4, said upper row further having a fifth group of keys including two subsets, a first subset of keys being positioned to the left of the third group and a second subset of keys being positioned to the right of the third group, the first subset of keys of the fifth group including the letters "C" and "D" arranged from left to right and the second subset of keys including the letters "P" and "L" arranged from left to right.

6. In a keyboard for typewriters, word processors, computers, and the like, having a housing and a plurality of manually actuated keys secured to the housing including keys for each letter of the alphabet and a plurality of character keys, said keys being arranged in three rows consisting of a central home row, an upper row positioned above the home row, and a lower row positioned below the home row, said lower row having 10 keys, said lower row having a first group of keys including the letters "I", "O" and "U" arranged from left to right, said "I", "O", and "U" keys respectively occupying the $4^{th}$, $5^{th}$ and $6^{th}$ key positions counting from left to right in the row.

7. The keyboard set forth in claim 6, said central home row having a second group of keys including the letters "E" and "A" arranged from left to right.

8. In a keyboard for typewriters, word processors, computers, and the like, having a housing and a plurality of manually actuated keys secured to the housing including keys for each letter of the alphabet and a plurality of character keys, said keys being arranged in rows including a central home row, an upper row positioned above the home row, and a lower row positioned below the home row, said lower row having a first group of keys including the letters "I", "O" and "U" arranged from left to right, said central home row having a second group of keys including the letters "E" and "A" arranged from left to right, said upper row having a third group of keys including the letters "S", "T" and "R" arranged from left to right.

9. The keyboard set forth in claim 8, said central home row further having a fourth group of keys including two subsets, a first subset of keys being positioned to the left of the second group and a second subset of keys being positioned to the right of the second group, the first subset of keys of the fourth group including the letters "M" and "N" arranged from left to right and the second subset of keys including the letters "H" and "G" arranged from left to right.

10. The keyboard set forth in claim 9, said upper row further having a fifth group of keys including two subsets, a first subset of keys being positioned to the left of the third group and a second subset of keys being positioned to the right of the third group, the first subset of keys of the fifth group including the letters "C" and "D" arranged from left to right and the second subset of keys including the letters "P" and "L" arranged from left to right.

11. In a keyboard for typewriters, word processors, computers, and the like, having a housing and a plurality of manually actuated keys secured to the housing including keys for each letter of the alphabet and a plurality of character keys, said keys being arranged in rows including a central home row, an upper row positioned above the home row, and a lower row positioned below the home row, said upper row having a first group of keys including the letters "S", "T" and "R" arranged from left to right.

12. The keyboard set forth in claim 11, said central home row having a second group of keys including the letters "E" and "A" arranged from left to right.

13. The keyboard set forth in claim 12, said lower row having a third group of keys including the letters "I", "O" and "U" arranged from left to right.

14. The keyboard set forth in claim 13, said upper row further having a fourth group of keys including two subsets, a first subset of keys being positioned to the left of the first group and a second subset of keys being positioned to the right of the first group, the first subset of keys of the fourth group including the letters "C" and "D" arranged from left to right and the second subset of keys including the letters "P" and "L" arranged from left to right.

15. The keyboard set forth in claim 14, said central home row further having a fifth group of keys including two subsets, a first subset of keys being positioned to the left of the second group and a second subset of keys being positioned to the right of the second group, the first subset of keys of the fifth group including the letters "M" and "N" arranged from left to right and the second subset of keys including the letters "H" and "G" arranged from left to right.

16. In a keyboard for typewriters, word processors, computers, and the like, having a housing and a plurality of manually actuated keys secured to the housing including keys for each letter of the alphabet and a plurality of character keys, said keys being arranged in rows including a central home row, an upper row positioned above the home row, and a lower row positioned below the home row, said central home row having a first group of keys including two subsets, a first subset of keys being positioned to the left of a predetermined group of keys and a second subset of keys being positioned to the right of the predetermined group, the first subset of keys of the first group including the letters "M" and "N" arranged from left to right and the second subset of keys including the letters "H" and "G" arranged from left to right.

17. The keyboard set forth in claim 16, said predetermined group of keys of the central home row defining a second group of keys including the letters "E" and "A" arranged from left to right.

18. The keyboard set forth in claim 17, said lower row having a third group of keys including the letters "I", "O" and "U" arranged from left to right.

19. The keyboard set forth in claim 18, said upper row having a fourth group of keys including the letters "S", "T" and "R" arranged from left to right.

20. The keyboard set forth in claim 19, said upper row further having a fifth group of keys including two subsets, a first subset of keys being positioned to the left of the fourth group and a second subset of keys being positioned to the right of the fourth group, the first subset of keys of the fifth group including the letters "C" and "D" arranged from left to right and the second subset of keys including the letters "P" and "L" arranged from left to right.

21. In a keyboard for typewriters, word processors, computers, and the like, having a housing and a plurality of manually actuated keys secured to the housing including keys for each letter of the alphabet and a plurality of character keys, said keys being arranged in rows including a central home row, an upper row positioned above the home row, and a lower row positioned below the home row, said upper row having a first group of keys including two subsets, a first subset of keys being positioned to the left of a predetermined group of keys and a second subset of keys being positioned to the right of the predetermined group, the first subset of keys of the first group including the letters "C" and "D" arranged from left to right and the second subset of keys including the letters "P" and "L" arranged from left to right.

22. The keyboard set forth in claim 21, said predetermined group of keys of the upper row defining a second group of keys including the letters "S", "T" and "R" arranged from left to right.

23. The keyboard set forth in claim 22, said central home row having a third group of keys including the letters "E" and "A" arranged from left to right.

24. The keyboard set forth in claim 23, said lower row having a fourth group of keys including the letters "I", "O" and "U" arranged from left to right.

25. The keyboard set forth in claim 24, said central home row further having a fifth group of keys including two subsets, a first subset of keys being positioned to the left of the third group and a second subset of keys being positioned to the right of the third group, the first subset of keys of the fifth group including the letters "M" and "N" arranged from left to right and the second subset of keys including the letters "H" and "G" arranged from left to right.

* * * * *